United States Patent [19]
Iwata

[11] Patent Number: 5,566,776
[45] Date of Patent: Oct. 22, 1996

[54] DIFFERENTIAL LIMIT TORQUE CONTROL APPARATUS

[75] Inventor: Toru Iwata, Yokohama, Japan

[73] Assignee: Nissan Motor Co., Ltd., Yokohama, Japan

[21] Appl. No.: 402,220

[22] Filed: Mar. 10, 1995

[30] Foreign Application Priority Data

Mar. 16, 1994 [JP] Japan ................................ 6-045952

[51] Int. Cl.$^6$ .................................................. B60K 28/16
[52] U.S. Cl. ...................................... 180/197; 364/426.03
[58] Field of Search ...................... 180/197; 364/426.01, 364/426.03, 424.01; 123/403, 416, 417

[56] References Cited

U.S. PATENT DOCUMENTS

| | | | |
|---|---|---|---|
| 5,117,934 | 6/1992 | Tsuyama et al. | 180/197 |
| 5,180,027 | 1/1993 | Hagiya | 180/197 |
| 5,224,565 | 7/1993 | Tamura et al. | 180/197 |
| 5,428,539 | 6/1995 | Kawamura et al. | 180/197 X |

FOREIGN PATENT DOCUMENTS 1-147127  6/1989  Japan.

*Primary Examiner*—Kevin Hurley
*Assistant Examiner*—Victor E. Johnson
*Attorney, Agent, or Firm*—Lowe, Price, Leblanc & Becker

[57] ABSTRACT

A traction control apparatus for use with an automotive vehicle having an internal combustion engine through which an output drive is transmitted to drive road wheels. A demand for first traction control is produced based on a slippage produced on the drive road wheels during acceleration. The first traction control demand includes a normal demand for first traction control continuing for a time shorter than a limit time and an exceptional demand for first traction control continuing over the limit time. A limit value is set for the number of times the exceptional demand is permitted. In response to the first traction control demand, at least one of fuelcut control and ignition control is performed to reduce the engine output drive. The first traction control demand is ignored when the number of times the exceptional demand has occurred reaches the limit value.

7 Claims, 6 Drawing Sheets

5,566,776

DIFFERENTIAL LIMIT TORQUE CONTROL APPARATUS

BACKGROUND OF THE INVENTION

This invention relates to a traction control apparatus for reducing an engine output transmitted to drive road wheels in response to a slippage produced on the vehicle drive wheels during deceleration.

For example, Japanese Patent Kokai No. 1-14712 discloses a vehicle traction control apparatus which responds to a slippage produced during vehicle deceleration by terminating the delivery of fuel to some engine cylinders so as to reduce the engine output. If the amount of fuel to the other engine cylinders is increased to provide efficient cooling of the engine during the traction control, unburnt fuel will be discharged from the other engine cylinders into the engine exhaust system and mixed therein with the fresh air discharged from the some engine cylinders. The mixture is burnt to overheat the engine exhaust system and degrade the catalytic converter provided in the engine exhaust system. The conventional traction control apparatus avoids this problem by inhibiting any increase in the amount of fuel to the other engine cylinder during traction control. Without effective engine cooling, however, the engine will overheat during long continuous traction control.

SUMMARY OF THE INVENTION

It is an object of the invention to provide an improved vehicle traction control apparatus which can ensure good traction control response to a slippage produced during vehicle acceleration.

Another object of the invention is to provide an improved vehicle traction control apparatus which is free from engine exhaust system overheat problems associated with long continuous traction control.

There is provided, in accordance with the invention, a traction control apparatus for use with an automotive vehicle having an internal combustion engine through which an output drive is transmitted to drive road wheels. The traction control apparatus comprises means for detecting a slippage produced on the drive road wheels during acceleration, means for setting a limit time, means for producing a demand for first traction control on the detected slippage, the first traction control demand including a normal demand for first traction control continuing for a time shorter than the limit time and an exceptional demand for first traction control continuing over the limit time, means for setting a limit value for the number of times the exceptional demand is permitted, first traction control means responsive to the first traction control demand for performing at least one of fuelcut control and ignition control to reduce the engine output drive, and means for inhibiting the response of the first traction control means to the first traction control demand when the number of times the exceptional demand has occurred reaches the limit value.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
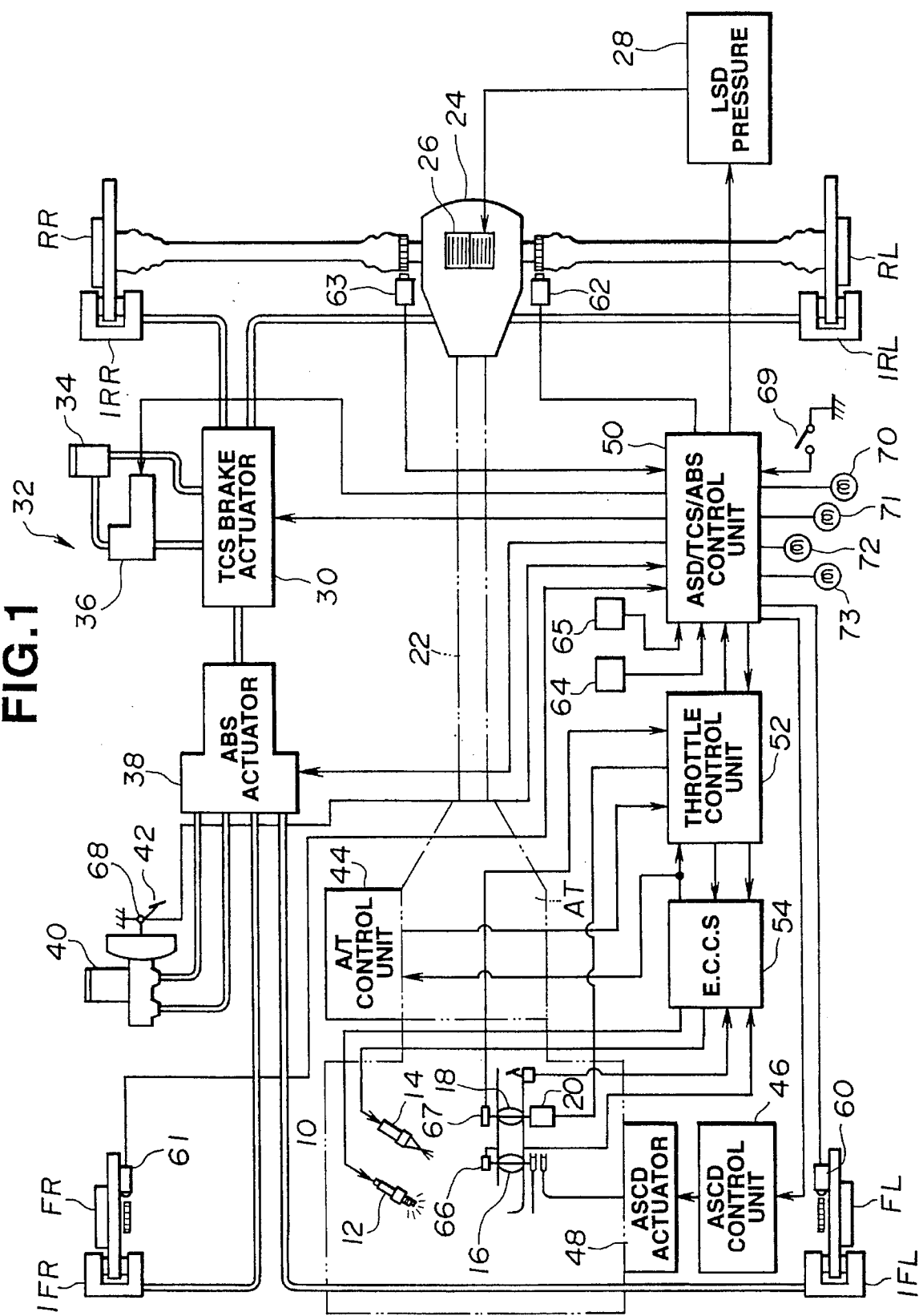
FIG. 1 is a schematic block diagram showing one embodiment of a vehicle traction control apparatus made in accordance with the invention.

With reference to the drawings, and in particular to FIG. 1, there is shown a schematic block diagram of a traction control apparatus embodying the invention.

The invention will be described in connection with a rear wheel driven automotive vehicle supported on a pair of front road wheels FL and FR and a pair of rear road wheels RL and RR. The automotive vehicle includes an internal combustion engine 10 as schematically shown including a spark plug 12, a fuel injector 14 and first and second throttle valves 16 and 18 situated within an induction passage. The spark plug 12 ignites the combustion ingredients within the engine cylinder when the spark plug is energized by the presence of an electrical signal fed thereto from an engine control unit (ECCS) 54. The fuel injector 14 opens to inject fuel into the induction passage when it is energized by the presence of an electrical signal fed thereto from the engine control unit 54. The first throttle valve 16 is connected by a mechanical linkage to an accelerator pedal. The degree of rotation of the first throttle valve 16 is manually controlled by the operator. The second throttle valve 18 is rotated by a throttle motor 20 which is operable on a command from a throttle control unit 52.

A drive from the engine 10 is transmitted to a propeller shaft 22 through an automatic transmission A/T controlled by an A/T control unit 44. It is then taken by a final drive unit 24 which contains a final drive and a differential. The final drive turns the drive round through 90 degrees and reduces the speed in a selected ratio. The differential divides the drive equally between the two output shafts which are connected through universal joints to the respective rear road wheels RL and RR. The differential is taken in the form of a limited slip differential (LSD) including a differential limit clutch 26 which receives a clutch control pressure from a LSD pressure generator 28 and produces a differential limit torque corresponding to the clutch control pressure between the rear road wheels RL and RR. The LSD pressure generator 28 includes a source of pressurized oil and a control valve operable on a command from a LSD/TCS/ABS control unit 50 to control the clutch control pressure applied to the differential limit clutch 26.

Wheel cylinders 1FL, 1FR, 1RL and 1RR are associated with the road wheels FL, FR, RL and RR for application of brakes to the respective road wheels. The wheel cylinders 1RL and 1RR have a direct supply of hydraulic pressure from a TCS brake actuator 30 associated with a hydraulic pressure source 32 shown as including a reservoir 34 and a motor-driven pump 36. The wheel cylinders 1FR and 1FL have a supply of hydraulic pressure from the TCS brake actuator 30 through an ABS actuator 38 associated with a master cylinder 40 which has pistons actuated through a brake pedal 42 by the operator.

The LSD/TCS/ABS control unit 50 performs a first traction control which includes at least one of fuelcut control and ignition control to reduce the engine output transmitted to the drive road wheels in response to a slippage produced during vehicle deceleration. For this purpose, the LSD/TCS/ABS control unit 50 produces control signals to the throttle control unit 52 which thereby controls, through the engine control unit 54, the spark plug 12 in a manner to retard the ignition timing (referred to as TCS ignition control) and also the fuel injector 14 in a manner to interrupt the delivery of fuel to at least a part of the engine cylinders (referred to as TCS fuelcut control).

The LSD/TCS/ABS control unit 50 performs a second traction control, which is different from the first traction control, to reduce the engine output transmitted to the drive road wheels in response to a slippage produced during vehicle deceleration. For this purpose, the LSD/TCS/ABS control unit 50 produces a control signal to the throttle control unit 52 which thereby controls the current flow through the throttle motor 20 to open and close the second throttle valve 18 (referred to as TCS throttle control). The LSD/TCS/ABS control unit 50 produces a control signal to the TCS brake actuator 30 for TCS brake control. The LSD/TCS/ABS control unit 50 produces a control signal to the LSD pressure generator 28 which thereby determines the clutch control pressure to the differential limit clutch 26 for TCS differential limit control. For example, it is possible to suppress acceleration slippage on one of the rear left and right road wheels RL and RR by increasing the differential limit torque to transmit a part of the transmitted drive force to the one rear wheel to the other rear wheel.

These first and second traction controls are performed in the LSD/TCS/ABS control unit 50 based upon various conditions of the automotive vehicle that are sensed during its operation. These sensed conditions include left front road wheel rotational speed $V_{ANL}$, right front road wheel rotational speed $V_{ANR}$, left rear road wheel rotational speed $V_{NAL}$, right rear road wheel rotational speed $V_{NAR}$, lateral acceleration $Y_G$, longitudinal acceleration $X_G$, first throttle valve position $\theta_1$ and second throttle valve position $\theta_2$. Thus, a left front road wheel rotational speed sensor 60, a right front road wheel rotational speed sensor 61, a left rear road wheel rotational speed sensor 62, a right rear road wheel rotational speed sensor 63, a lateral acceleration sensor 64, a longitudinal acceleration sensor 65, a first throttle valve position sensor 66 and a second throttle valve position sensor 67 are connected directly or indirectly to the LSD/TCS/ABS control unit 50. The LSD/TCS/ABS control unit 50 also receives a switch signal from a brake switch 68 and an TCS control command signal from a TCS switch 69.

The left front road wheel rotational speed sensor is positioned to produce a signal indicative of the speed $V_{ANL}$ of rotation of the left front road wheel FL. The right front road wheel rotational speed sensor 61 is positioned to produce a signal indicative of the speed VB of rotation of the right front road wheel FR. The left rear road wheel rotational frequency sensor 62 is positioned to produce a signal indicative of the speed $V_{ANL}$ of rotation of the left rear road wheel FL. The right rear road wheel rotational speed sensor 63 is positioned to produce a signal indicative of the speed $V_{NAR}$ of rotation of the right rear road wheel RR. The lateral acceleration sensor 64 is provided to produce a signal indicative of the lateral acceleration $Y_G$ of the vehicle. The longitudinal acceleration sensor 65 is provided to produce a signal indicative of the longitudinal acceleration $X_G$ of the vehicle. The first throttle valve position sensor 66 is associated with the first throttle valve 16 and it produces a signal indicative of the angular position $\theta_1$ of the first throttle valve 16. The second throttle valve position sensor 67 is associated with the second throttle valve 18 and it produces a signal indicative of the angular position $\theta_2$ of the second throttle valve 18. The brake switch 68 is associated with the brake pedal 42 to produce a switch signal in the presence of vehicle braking. The TCS switch 69 is operated by the operator for producing a switch signal indicative of an operator's demand for TCS control. The LSD/TCS/ABS control unit 50 produces an ABS control command to the ABS actuator 38. The LSD/TCS/ABS control unit 50 also produces command signals to a TCS indicator 70, a TCS warning lamp 71, an ABS warning lamp 72 and an LSD warning lamp 73. The TCS indicator 70 is actuated to indicate a TCS operation. The TCS warning lamp 71 is actuated to indicate a failure in the TCS operation. The ABS warning lamp 72 is actuated to indicate a failure a failure in the ABS operation. The LSD warning lamp 73 is actuated to indicate in the LSD operation. The LSD/TCS/ABS control unit 50 also controls a constant-speed control system shown as including an ASCD control unit 46 and an ASCD actuator 48.

The throttle control unit 52 has inputs from the first and second throttle valve position sensors 66 and 67 for controlling the throttle motor 20 based on the first and second throttle valve position $\theta_1$ and $\theta_2$. The engine control unit 54 controls the spark plug 12, the fuel injector 14 and an A/T control unit 44 for controlling the automatic transmission A/T.

The LSD/TCS/ABS control unit 50 comprises a digital computer which includes a central processing unit (CPU), a random access memory (RAM), a read only memory (ROM) and an input/output control unit (I/O). The central processing unit communicates with the rest of the computer via a data bus. The input/output control unit includes an analog-to-digital converter which receives analog signals from the various sensors and converts them into digital form for application to the central processing unit. The read only memory contains the program for operating the central processing unit and further contains appropriate data in look-up tables used for LSD, TCS and ABS controls.

Figure 2:
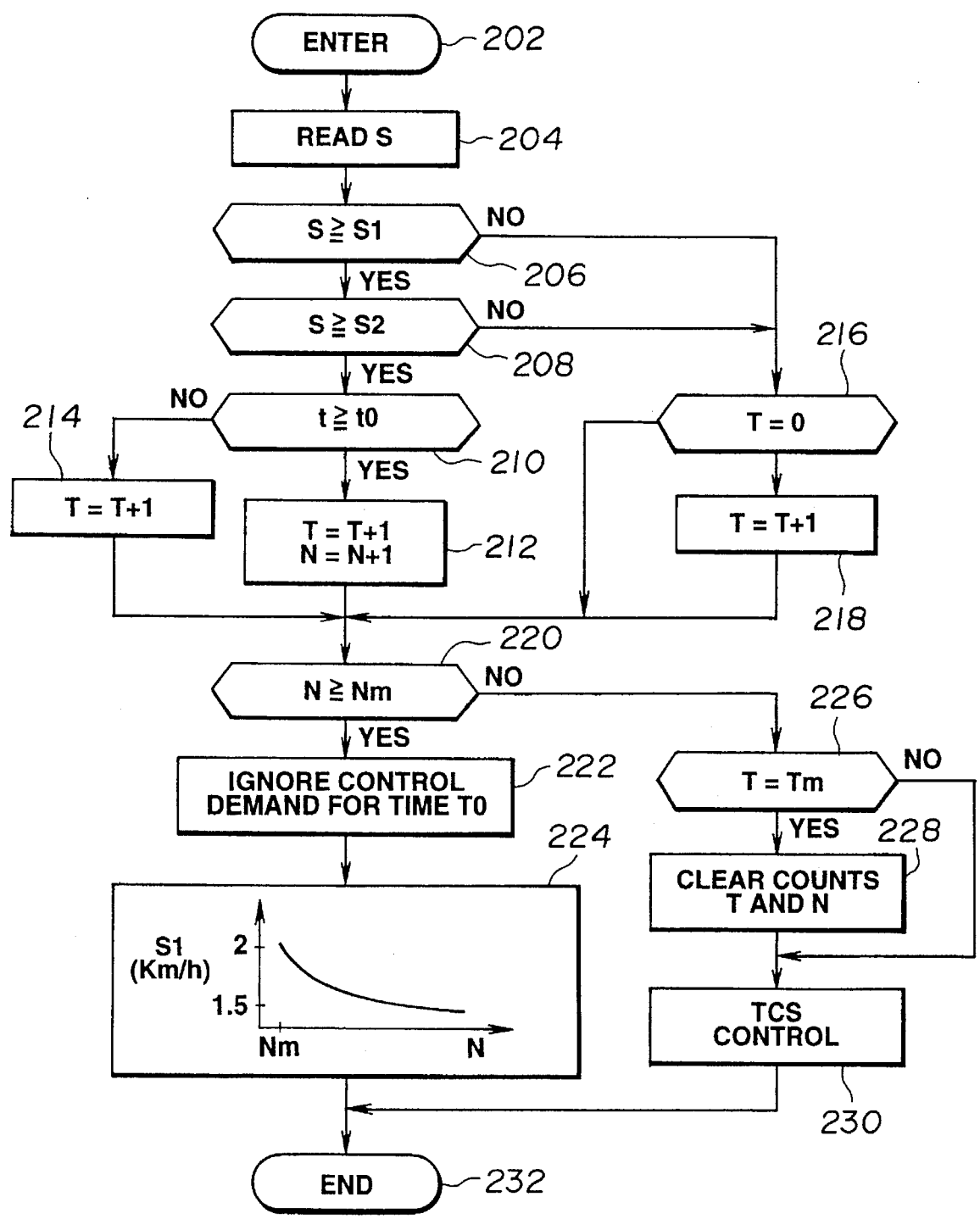
FIG. 2 is a flow diagram illustrating the programming of the digital computer as it is used to perform first traction control taken in the form of TCS fuelcut control.

FIG. 2 is a flow diagram illustrating the programming of the digital computer as it is used to perform first traction control taken in the form of TCS fuelcut control by interrupting the delivery of fuel through the fuel injector 14. The computer program is entered at the point 202 at uniform intervals of time. At the point 204 in the program, a slippage S is calculated. This calculation is made based on the left front road wheel rotational speed $V_{ANL}$, the right front road wheel rotational speed $V_{ANR}$, the left rear road wheel rotational speed $V_{ANL}$ and the right rear road wheel rotational speed $V_{NAR}$. For example, the slippage S may be calculated as the difference between the averaged drive wheel speed and the averaged driven wheel speed. At the point 206 in the program, a determination is made as to whether or not the calculated slippage S is equal to or greater than a threshold value S1, for example, 3 km/h. If the answer to this question is "yes", then it means that slip occurs and the program proceeds to the point 208. Otherwise, the program proceeds to the point 216.

At the point 208 in the program, a determination is made as to whether or not a demand exists for TCS fuelcut control. This determination is made by a comparison of the calculated slippage S with a predetermined value S2, for example 4.5 km/h. If the calculated slippage S is equal to or greater than the predetermined value S2, then the program proceeds to the point 210. Otherwise, the program proceeds to the point 216. At the point 210 in the program, a determination is made as to whether or not a demand occurs for TCS fuelcut control continuing for a time t longer than a predetermined limit time to, for example, 1 second If the answer to this question is "yes" then the program proceeds to the point 212 where the counts T and N of first and second counters are incremented by one step and then to the point 220. The count N indicates the number of times an exception demand occurs for TSC fuelcut control continuing for a time t longer than a predetermined limit time to Otherwise, the program proceeds to the point 214 where the count T of the first counter is incremented by one step and then to the point 220.

At the point 216 in the program, a determination is made as to whether or not the count T of the first counter is zero. If the answer to this question is "yes", then the program proceeds to the point 220. Otherwise, the program proceeds to the point 218 where the count T of the first counter is incremented by one step and then to the point 220.

At the point 220 in the program, a determination is made as to whether or not the count N of the second counter is equal to or greater than a predetermined limit value Nm, for example, 3. If the answer to this question is "yes", then it means the number of times a demand for TCS fuelcut control continuing over the predetermined time to occurs exceeds an allowable value and the program proceeds to the point 222. At the point 222, the demand for TCS fuelcut control is ignored for a predetermined time TO. Following this, the program proceeds to the point 224 where the threshold value S1 used at the point 206 for comparison of the slippage S is calculated as a function of the count N of the second counter. This threshold value S1 decreases as the count N of the second counter increases. Following this, the program proceeds to the end point 232.

If N<Nm, then the program proceeds from the point 220 to the point 226. At the point 226 in the program, a determination is made as to whether or not the count T of the first counter reaches a predetermined value Tm corresponding to a predetermined time, for example, 3 seconds. If the answer to this question is "yes", then the program proceeds to the point 228 where the counts T and N of the first and second counter is cleared to zero and then to the point 230. Otherwise, the program proceeds directly to the point 230 where a fuelcut control is executed according to the demand. Following this, the program proceeds to the end point 232.

Figure 3:
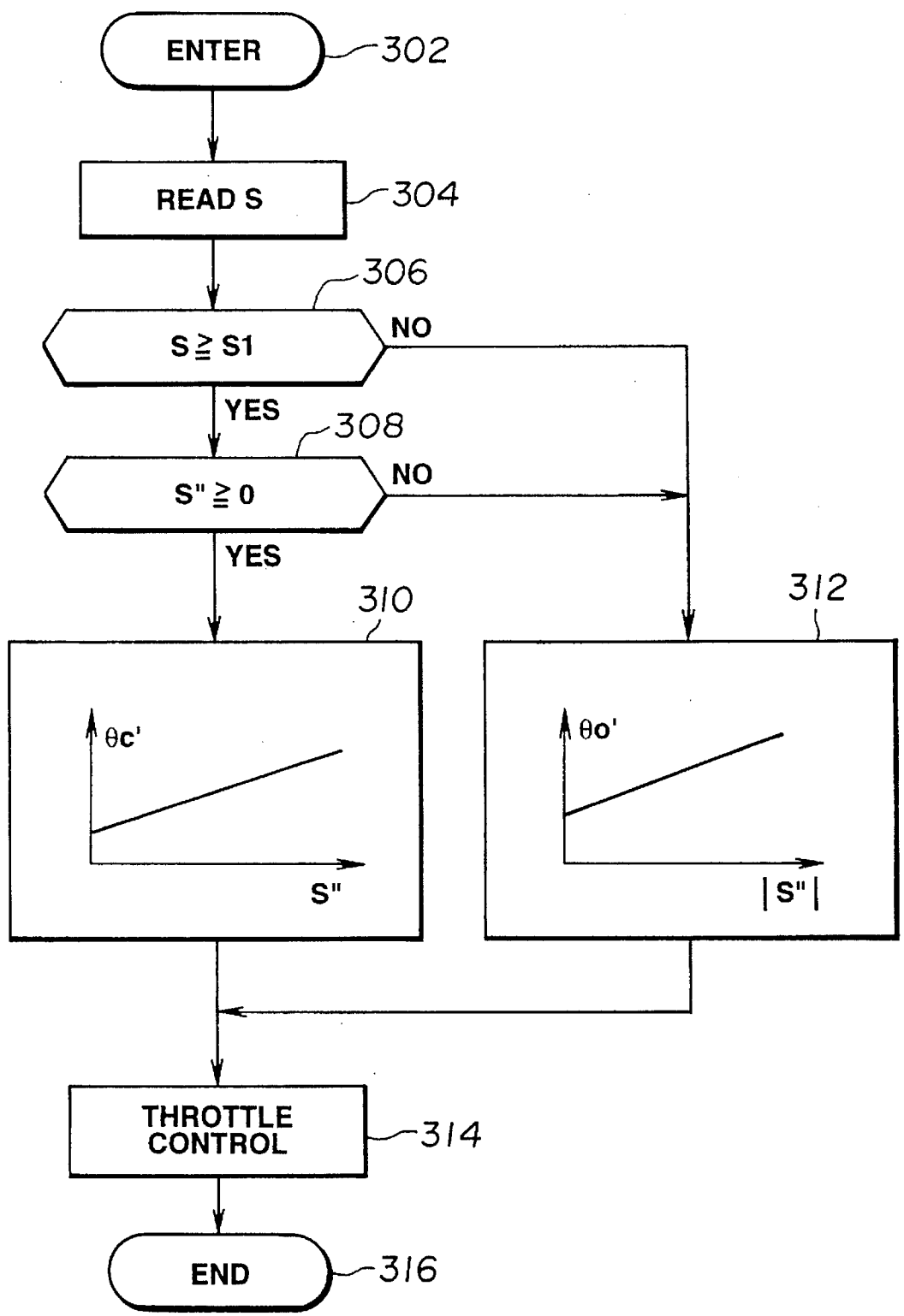
FIG. 3 is a flow diagram illustrating the programming of the digital computer as it is used to perform second traction control taken in the form of TCS throttle control.

FIG. 3 is a flow diagram illustrating the programming of the digital computer as it is used to perform second traction control taken in the form of TCS throttle control by controlling the position of the second throttle valve 18. The computer program is entered at the point 302 at uniform intervals of time. At the point 304 in the program, a slippage S is calculated. This calculation is made based on the left front road wheel rotational speed $V_{ANL}$, the right front road wheel rotational speed $V_{ANR}$, the left rear road wheel rotational speed $V_{NAL}$ and the right rear road wheel rotational speed $V_{NAR}$. For example, the slippage S may be calculated as the difference between the averaged drive wheel speed and the averaged driven wheel speed. A t the point 306 in the program, a determination is made as to whether or not the calculated slippage S is equal to or greater than a threshold value S1, for example, 3 km/h. The threshold value S1 may be changed during the step at the point 224 of the flow diagram of FIG. 2. If the answer to this question is "yes", then it means that slip occurs and the program proceeds to the point 308. Otherwise, the program proceeds to the point 312.

At the point 308 in the program, a determination is made as to whether or not the rate S" of change of the calculated slippage S is positive. If the answer to this question is "yes", then the program proceeds to the point 310 where the speed θc' at which the throttle valve 18 is to close is calculated as a function of the calculated rate S" of change of the slippage S. The speed θc' increases as the calculated rate S" increases. Upon completion of this calculation, the program proceeds to the point 314 where a command is produced to close the throttle valve 18 at a speed corresponding to the calculated value θc'. Following this, the program proceeds to the end point 316.

If the rate S" of change of the slippage S is negative, then the program proceeds from the point 308 to the point 312 where the speed θo' at which the throttle valve 18 is to open is calculated as a function of the calculated rate S" of change of the slippage S. The speed θo' increases as the calculated rate S" increases. Upon completion of this calculation, the program proceeds to the point 314 where a command is produced to open the throttle valve 18 at a speed corresponding to the calculated value θo'. Following this, the program proceeds to the end point 316.

The operation of the vehicle traction control apparatus of the invention will be described further. When there is no TCS fuelcut control demand, that is, when the sensed slippage is less than the threshold value S2 or when the engine is operating at a high engine load, the program proceeds to the point 230. In this case, no TCS fuelcut control is performed. Thus, the slip produced during vehicle acceleration is suppressed only by the TCS throttle control performed according to the program as shown in FIG. 3.

When a normal demand occurs for TCS fuelcut control continuing for a time less than the predetermined time to, the demanded fuelcut control is performed at the point 228 of the program. In this case, the slip produced during vehicle acceleration is suppressed by both of the TCS fuelcut control and the TCS throttle control. The first counter starts accumulating a count T at the start of the TCS fuelcut control. The count T is cleared to zero each time the predetermined time Tm is elapsed.

When the TCS fuelcut control demand is diminished, the count T is incremented by one step at the point 218. When the count T reaches a predetermined value Tm, the count T is cleared to zero at the point 228. The first counter starts accumulating a count T at the start of the TCS fuelcut control. The count T is cleared to zero each time the predetermined time Tm is elapsed.

Figure 4:
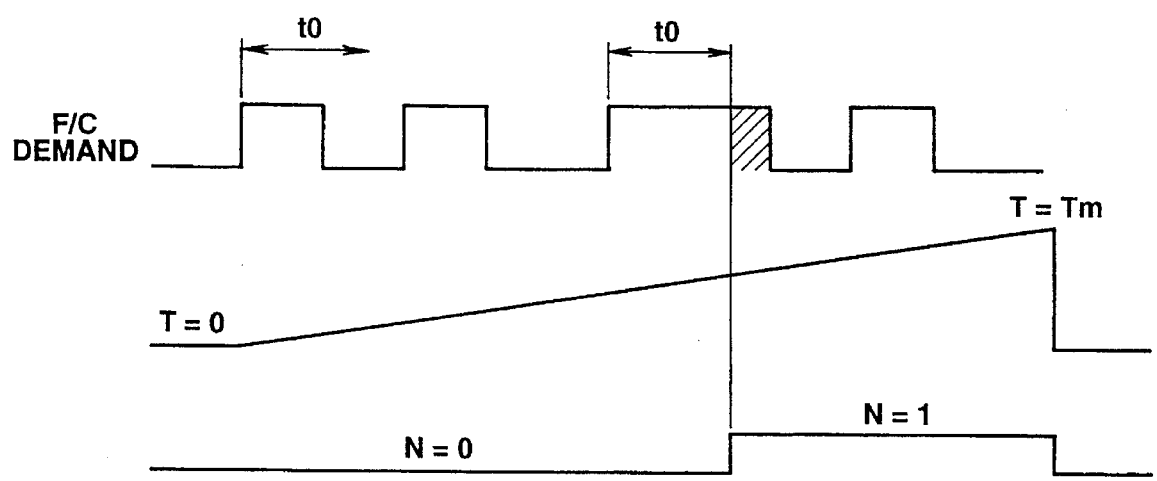
FIG. 4 is a time chart used in explaining the operation of the vehicle traction control apparatus of the invention.

When an exceptional fuelcut control demand occurs the demanded exceptional fuelcut control is performed at the point 230. The count N is incremented by one step each cycle of execution of this program at the step 212. The exceptional fuelcut control continues until the count N reaches the predetermined value Nm. The count N of the second counter remains at zero for a normal fuelcut control demand and it changes to 1 for an exceptional fuelcut control demand, as shown in FIG. 4. The first and second counters start accumulating counts T and N at the start of the fuelcut control. The counts T and N are cleared to zero each time the predetermined time Tm is elapsed. Assuming that the predetermined value Nm is 3, thus, the number of times the exceptional fuelcut control demand is permitted is two. Consequently, the TCS fuelcut control is performed certainly as long as the number of times the exceptional fuel cut control demand occurs does not exceed the predetermined number Nm. This is effective to provide a good traction control response to a slippage produced during vehicle acceleration. Since the length of time of the continuous fuelcut control is limited to a predetermined time to and the number of times the exceptional fuelcut control is performed is limited to a predetermined value Nm, it is possible to eliminate the danger of overheating the engine and engine exhaust system.

When the number of times the exceptional fuelcut control demand occurs exceeds the predetermined value Nm, the program proceeds from the point 220 to the point 222 where the fuelcut control demand is ignored, that is, the TCS fuelcut control is inhibited, for a predetermined time TO. In this case, the threshold value S1 is changed to a smaller value for use in the TCS throttle control program of FIG. 3. The reduction of the threshold value S1 provides a greater weight on the TCS throttle control to ensure good traction control for the slip produced during vehicle acceleration.

Figure 5:
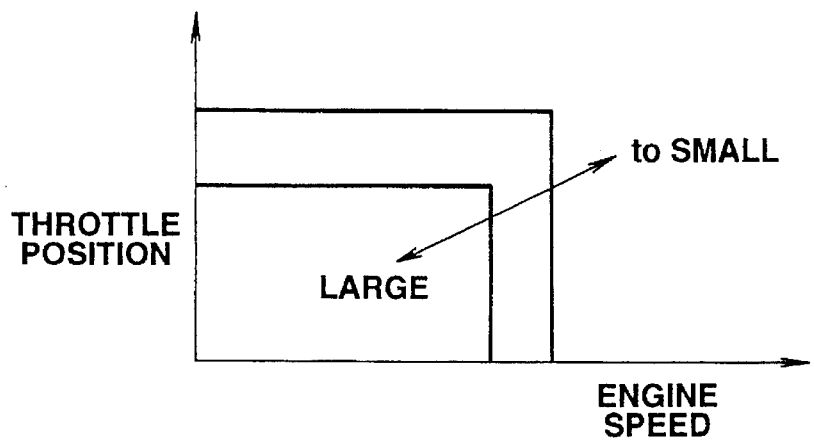
FIG. 5 is a graph showing variations in the limit time with respect to the throttle valve position and the engine speed.
Figure 6:
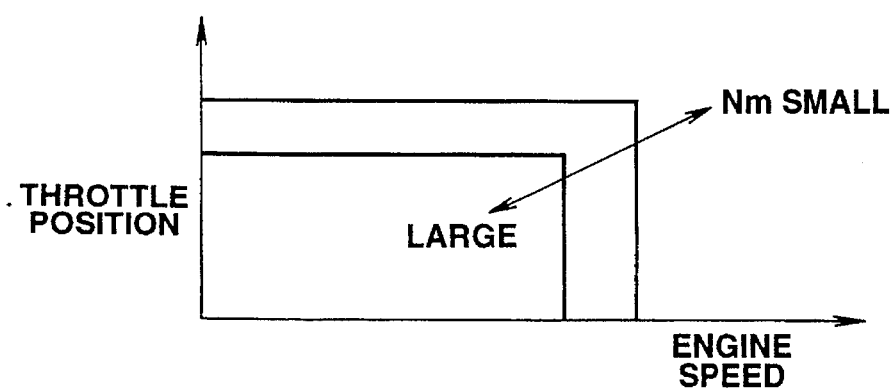
FIG. 6 is a graph showing variations in the limit value with respect to the throttle valve position and the engine speed.
Figure 7:
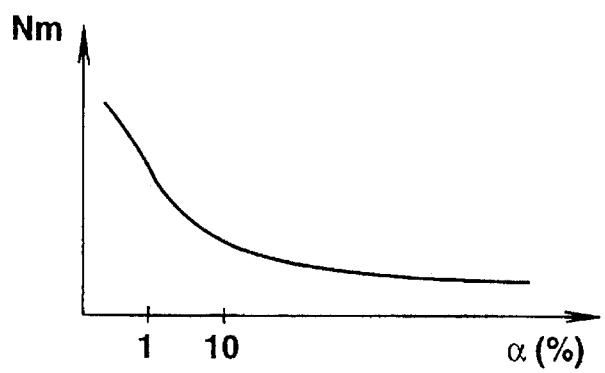
FIG. 7 is a graph showing variations in the limit value for the number of times the exceptional first traction control demand is permitted with respect to the TCS operation history.

A1 though the TCS fuel cut control has been described in connection with a limit time to fixed at a predetermined value, for example, 1 seconds, it is to be understood that the limit time to may be determined as a function of engine speed and throttle valve position. For example, the limit time to may be set at a variable decreasing as the engine speed increases and as the throttle valve position increases, as shown in FIG. 5, so that the limit time to corresponds to the amount of unburnt gases produced from the engine. Although the TCS fuelcut control has been described in connection with a limit value Nm fixed at a predetermined value, for example, 3, it is to be understood that the limit value Nm may be determined as a function of engine speed and throttle valve position. For example, the limit value Nm may be set at a variable decreasing as the engine speed increases and as the throttle valve position increases, as shown in FIG. 6, or as the TCS operation history α(=A/B where A is the Σ TCS operation time and B is a predetermined vehicle travelling time) increases, as shown in FIG. 7, so that the value Nm corresponds to the amount of unburnt gases produced from the engine.

Figure 8A:
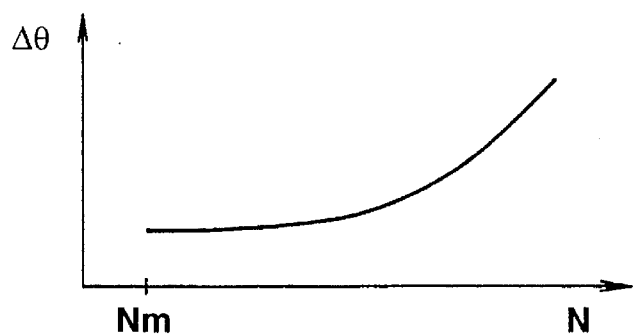
FIG. 8A is a graph showing variations in the angle at which the throttle valve is to close with respect to the number of times the exceptional first traction control demand occurs.
Figure 8B:
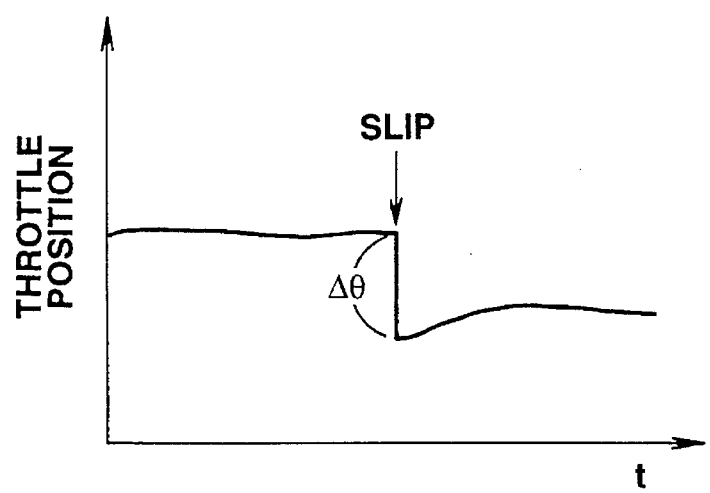
FIG. 8B is a graph of throttle valve position versus time.
Figure 9:
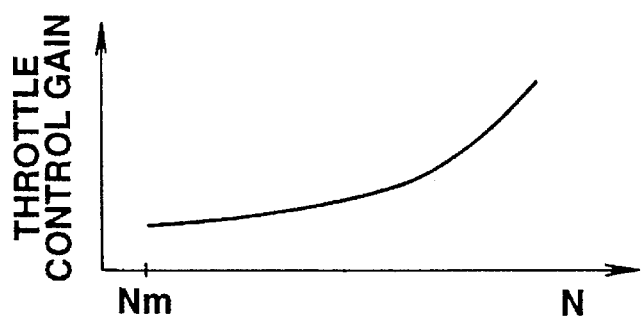
FIG. 9 is a graph showing variations in the speed at which the throttle valve is to open or close with respect to the number of times the exceptional first traction control command occurs.

Although the TCS throttle control has been described in connection with a threshold value S1 decreasing as the count N increases to increase the weight on the TCS throttle control when the TCS fuelcut control is inhibited, it is to be understood that the angle Δθ at which the throttle valve is controlled to rotate in the presence of slip may be increased as the count N increases, as shown in FIGS. 8A and 8B, or the throttle control gain, that is, the speed at which the throttle valve is controlled to open or close may be increased as the count N increases.

A1 though the first traction control has been described in the form of TCS fuelcut control, it is to be understood that at least one of TCS fuelcut control and TCS ignition control may be performed for the first traction control. Although the second traction control has been described in the form of TCS throttle control, it is to be understood that TCS differential limit control, TCS brake force control, TCS transmission ratio control and TCS drive or brake force control may be performed singly or in combination for the second traction control.

What is claimed is:

1. A traction control apparatus for use with an automotive vehicle having an internal combustion engine through which an output drive is transmitted to drive road wheels, comprising:

means for detecting a slippage produced on the drive road wheels during acceleration;

means for producing first traction control demands repetitively at time intervals when the detected slippage exceeds a predetermined value, the first traction control demands including normal and exceptional demands;

means for setting a limit time;

first traction control means responsive to the normal demand for performing at least one of fuelcut control and ignition control to reduce the engine output drive for a time shorter than the limit time and responsive to the exceptional demand for performing at least one of fuelcut control and ignition control to reduce the engine output drive for a time longer than the limit time;

means for counting the number of times the exceptional demand has been provided to the first traction control means;

means for setting a limit value; and means for inhibiting the response of the first traction control means to first traction control demand for a predetermined period of time when the counted number reaches the limit value.

2. The traction control apparatus as claimed in claim 1, further including means for detecting an engine speed, means for detecting a throttle valve position, and means for decreasing the limit time as the detected engine speed increases and as the detected throttle valve position increases.

3. The traction control apparatus as claimed in claim 2, wherein the limit value setting means includes means for decreasing the limit value as the detected engine speed increases and as the detected throttle valve position increases.

4. The traction control apparatus as claimed in claim 3, further comprising:

second traction control means for performing a second traction control different from the first traction control to reduce the output drive transmitted from the engine to the drive road wheels when the detected slippage exceeds a threshold value less than the predetermined slippage valve; and means for decreasing the threshold valve as the counted number increases.

5. The traction control apparatus as claimed in claim 1, wherein the limit value setting means includes means for detecting an engine speed, means for detecting a throttle valve position, and means for decreasing the limit value as the detected engine speed increases and as the detected throttle valve position increases.

6. The traction control apparatus as claimed in claim 5, further comprising:

second traction control means for performing a second traction control different from the first traction control to reduce the output drive transmitted from the engine to the drive road wheels when the detected slippage exceeds a threshold valve less than the predetermined slippage value; and means for decreasing the threshold value as the counted number increases.

7. The traction control apparatus as claimed in claim 1, further comprising:

second traction control means for performing a second traction control different from the first traction control to reduce the output drive transmitted from the engine to the drive road wheels when the detected slippage exceeds a threshold value less than the predetermined slippage value; and means for decreasing the threshold value as the counted number increases.

* * * * *